United States Patent [19]
Bates et al.

[11] Patent Number: 5,826,673
[45] Date of Patent: Oct. 27, 1998

[54] HYBRID ELECTRIC PROPULSION SYSTEM USING A DUAL SHAFT TURBINE ENGINE

[75] Inventors: Bradford Bates, Ann Arbor; Richard C. Belaire, Whitmore Lake; Craig Hammann Stephan, Ann Arbor, all of Mich.

[73] Assignee: Ford Global Technologies, Inc., Dearborn, Mich.

[21] Appl. No.: 978,258

[22] Filed: Nov. 26, 1997

Related U.S. Application Data

[63] Continuation of Ser. No. 551,261, Oct. 31, 1995, Pat. No. 5,762,156, and Ser. No. 551,262, Oct. 31, 1995, Pat. No. 5,584,174.

[51] Int. Cl.⁶ .................................................. B60K 6/00
[52] U.S. Cl. ........................ 180/165; 180/65.4; 180/301; 60/39.161
[58] Field of Search ................................. 180/65.2, 65.4, 180/69.4, 69.5, 165, 301, 302; 60/39.161, 39.163, 39.75; 415/101

[56] References Cited

U.S. PATENT DOCUMENTS

| | | |
|---|---|---|
| 2,443,770 | 6/1948 | Kasschau . |
| 3,771,311 | 11/1973 | Herbst ..................................... 180/301 |
| 3,771,916 | 11/1973 | Flanigan et al. ......................... 180/301 |
| 3,986,575 | 10/1976 | Eggmann ................................ 180/301 |
| 4,041,696 | 8/1977 | Morrison .............................. 60/39.163 |
| 4,157,011 | 6/1979 | Liddle . |
| 4,163,367 | 8/1979 | Yeh . |
| 4,290,268 | 9/1981 | Lowther . |
| 4,336,856 | 6/1982 | Gammell . |
| 4,473,753 | 9/1984 | Izumi et al. ............................ 180/165 |
| 4,495,451 | 1/1985 | Barnard ................................. 180/165 |
| 4,774,811 | 10/1988 | Kawamura ............................. 180/165 |
| 4,823,546 | 4/1989 | Cheng ................................. 60/39.161 |
| 4,945,811 | 8/1990 | Grieb ..................................... 60/39.75 |
| 5,492,189 | 2/1996 | Kriegler et al. ........................ 180/65.2 |
| 5,584,174 | 12/1996 | Bates et al. .......................... 60/39.161 |

FOREIGN PATENT DOCUMENTS 0279222  12/1987  Japan .................................... 180/65.3

OTHER PUBLICATIONS

Thortek–Alcoa/Fibertek Proposal to Ford Motor Company dated Oct. 31, 1994.

Author: Roger Rowand; Aritcle Title: NASA Confab is far out, but practical; Issue Date of Newspaper : Nov. 13, 1995; p. #6; Newspaper Title: Automotive News.

*Primary Examiner*—Robert J. Oberleitner
*Assistant Examiner*—C. T. Bartz
*Attorney, Agent, or Firm*—Damian Porcari

[57] ABSTRACT

An electric propulsion system for a vehicle having an electric drive motor. A generator supplies electric current to the motor. A dual shaft turbine engine having a compressor and a gasifier coupled with a first shaft and a power turbine, flywheel and generator coupled to a second shaft provide electric current to the electric drive motor. The first and second drive shafts are uncoupled and are allowed to spin independently of one another. Exhaust gases from the gasifier turn the power turbine, thus the turning power turbine turns the generator and flywheel as a unit.

12 Claims, 4 Drawing Sheets

HYBRID ELECTRIC PROPULSION SYSTEM USING A DUAL SHAFT TURBINE ENGINE

RELATED APPLICATIONS

This application is a continuation of application Ser. No. 08/551,261, filed Oct. 31, 1995, now U.S. Pat. No. 5,762, 156, and Ser. No. 08/551,262, now U.S. Pat. No. 5,584,174 titled: POWER TURBINE FLYWHEEL ASSEMBLY FOR A DUAL SHAFT TURBINE ENGINE, filed Oct. 31, 1995, naming Bates, Belaire, Stephan as inventors, and incorporated herein by reference.

BACKGROUND OF THE INVENTION

1. Field of the Invention

The present invention relates to a hybrid propulsion system for a vehicle using a turbine engine. More specifically, the present invention relates to the use of a dual shaft turbine engine having a flywheel directly coupled to the second shaft of the engine and uncoupled from the first shaft of the engine.

2. Description of the Related Art

Liquid fueled turbine engines have been used to power vehicles because of their operating efficiency and durability. They are especially useful when used at a constant speed and under a constant vehicle load. Operating a turbine engine at a constant speed and load greatly extends the durability of the engine and optimizes its fuel efficiency. Turbine engines may be directly coupled to the vehicle drive wheels to provide a mechanical drive or, alternatively, they maybe used to operate a generator to provide electric drive.

It is known to use a turbine engine to directly power the drive wheels of a vehicle as illustrated in U.S. Pat. No. 4,157,011, issued Jun. 5, 1979, to Liddle. The Liddle patent teaches the use of a single shaft turbine engine mechanically coupled through a continuously variable transmission to the vehicle drive wheels. The engine is used in an intermittent fashion and requires repeated restarts. A flywheel located between the turbine and the transmission provides a rotational inertia that is sufficient to start turbine engine. An optional clutch allows the turbine engine to be switched on and off. The vehicle may be manually driven for a short period of time on the inertia of the flywheel once the turbine engine is shut down. The primary disadvantages of this system are the limitations of continuously variable transmissions to transmit mechanical energy. Heavy vehicle load requirements, such as the torque needed to power the vehicle up hills or over obstacles, are transmitted through the transmission and to the turbine engine. This creates a load or drag on the engine and thereby reduces the engine's operating efficiency. Additionally, frictional forces within the continuously variable transmission significantly reduce the operating efficiency of the propulsion system. These and other disadvantages of mechanically coupling the engine to the drive wheels has led others to indirectly couple the turbine engine to the vehicle wheels.

To maintain the efficiency of a turbine engine, it has been used to power a generator. The generator in turn powers a vehicle traction motor that operates the drive wheels. A system that used this approach is illustrated in U.S. Pat. No. 4,336,856, issued Jun. 29, 1982, to Gamell. Like the Liddle patent, the Gamell patent teaches a single shaft turbine engine directly coupled to a generator/motor. The generator/motor in turn provides electrical current to power a vehicle traction motor. The motor drives the vehicle wheels.

A flywheel attached adjacent the drag turbine provides additional rotational inertia to the turbine engine. Single shaft turbine engines, as the type used in Gamell, suffer from the problem of transmitting vehicle drag to the turbine engine when the vehicle is under a significant load. This drag causes an increased torque on the turbine engine, thereby reducing the engine operating efficiency.

The flywheel taught by Gamell exposes the rotating, flywheel to ambient air. The air drag on the rotating flywheel reduces the flywheel efficiency and thus, the overall efficiency of the vehicle. Others have used flywheels contained within a vacuum enclosure to reduce the air drag on the flywheel. These systems have required gearing to match the flywheel rotational speed to that of the engine.

It is desirable to provide a turbine powered hybrid vehicle which decouples the turbine engine from the driven wheels. It is further desirable to combine a flywheel with the turbine engine to provide additional torque when the vehicle is under load or to provide a purely electric drive to the vehicle without the use of the turbine engine. It is also desired to provide a hybrid electric power train for a vehicle that permits the use of sealed flywheel within a vacuum enclosure. It is further desirable to provide a flywheel system that rotates directly with the output of the vehicle engine while contained within a vacuum enclosure. These and other advantages and features of the present invention would be more fully described below and in the accompanying drawings.

SUMMARY OF THE INVENTION

The present invention provides electric propulsion system for a vehicle having an electric drive motor. A generator supplies electric current to the motor. A dual shaft turbine engine having a compressor and a gasifier coupled with a first shaft, and a power turbine, flywheel and generator coupled to a second shaft provide electric current to the electric drive motor. The first and second drive shafts are uncoupled and are allowed to spin independently of one another. Exhaust gases from the gasifier turn the power turbine; thus the turning power turbine turns the generator and flywheel as a unit.

The electric drive motor may also be operated in a generator mode to provide regenerative braking in the vehicle. The generator may be used as a motor to accept regenerative braking energy from the motor/generator in the form of electric current to store that energy as rotational energy within the flywheel. The dual shaft turbine design permits the use of an uncoupled power turbine so that load or torque transmitted or demanded by the drive wheels is not directly presented to the first shaft of the turbine engine. Thus, the first shaft turns at a relatively constant velocity and the turbine engine maintains an overall high energy efficiency. The dual shaft design also permits the use of a flywheel directly coupled to the power turbine without the need of a clutch or transmission. This construction greatly simplifies starting the engine because the relatively heavier flywheel and generator/motor need not turn in tandem with the compressor and gasifier.

In an alternative embodiment of the present invention, the flywheel is enclosed within a sealed vacuum chamber so as to reduce the frictional loses in operating the flywheel. The flywheel is directly coupled to the second drive shaft by means of a magnetic coupling.

In yet another alternative embodiment of the present invention, the flywheel is integrated between blades of a power turbine to eliminate the need for a magnetic coupling and sealed vacuum chamber. This embodiment is believed to provide many of the drag reducing efficiencies of operating the flywheel in a vacuum environment without the complexities of the vacuum enclosure.

The use of an uncoupled second shaft permits the gasifier turbine to be started freely without load and operate independently of any load demanded by the drive wheels. Neither high speed clutches nor transmissions are needed because the power turbine is propelled by exhaust gases emitted from the gasifier turbine.

These and other objects and advantages of the present invention will become more apparent to those skilled in the art from the following description and reference to the attached drawings.

DETAILED DESCRIPTION OF THE PREFERRED EMBODIMENTS

Figure 1:
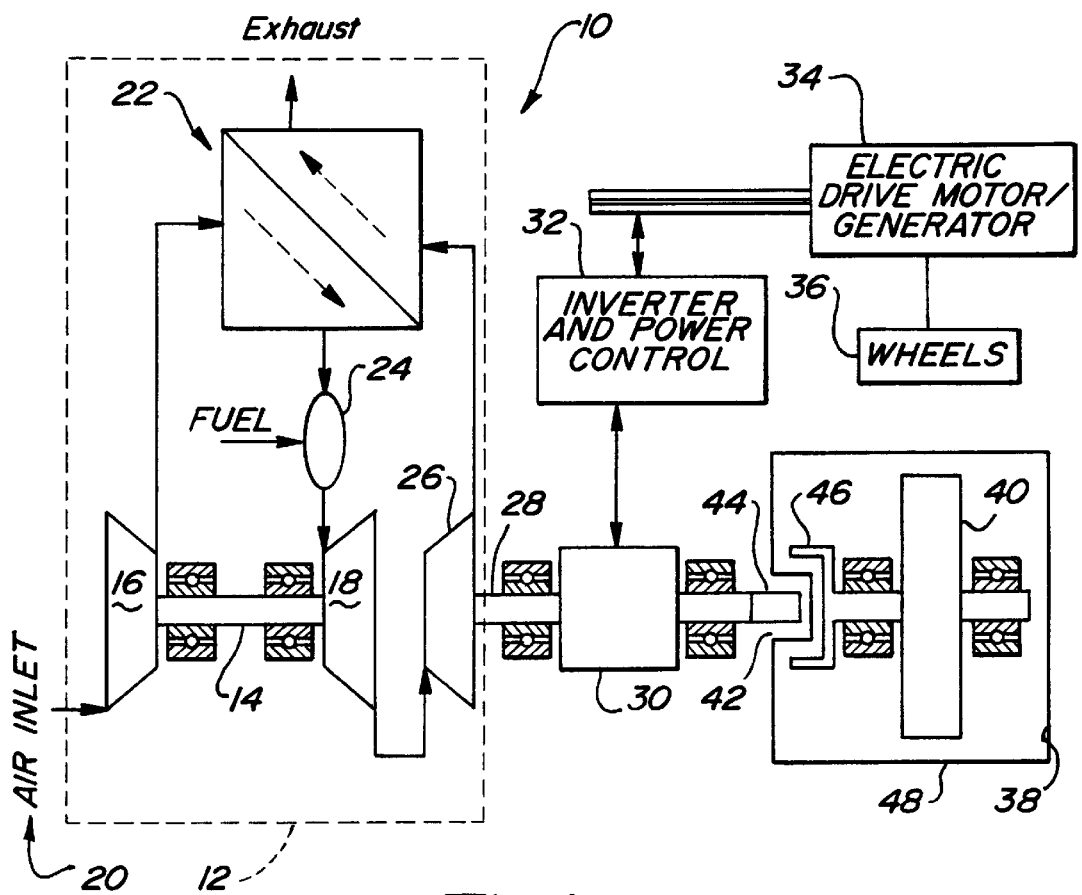
FIG. 1 is a diagrammatic view of a hybrid electric propulsion system using a vacuum containment chamber.

A schematic representation of the present invention is illustrated in FIG. 1. The hybrid electric vehicle propulsion system 10 includes a twin shaft turbine engine 12. The engine 12 includes a first shaft 14. a compressor turbine 16 and a gasifier turbine 18. The compressor turbine 16 receives ambient air from an air inlet 20. The compressed air passes through a heat exchanger 22. Fuel is added to the compressed air by a combuster 24. The air/fuel mixture coming from combuster 24 is ignited and directed to the gasifier turbine 18. The combustion byproducts from gasifier turbine 18 greatly expand in the form of high velocity exhaust gases. These gasses are directed from gasifier turbine 18 to a power turbine 26. The power turbine 26 is connected to a second shaft 28. The first shaft 14 and the second shaft 28 together form the dual shaft turbine engine 12. The exhaust gases cause power turbine 26 and the second shaft 28 to spin rapidly. Exhaust gases passing through power turbine 26 are directed to the heat exchanger 22 and exhausted. Dual shaft turbines that operate in this fashion are well known and have been used commercially in aircraft applications.

The rotary output of engine 12 is directly coupled through the second shaft 28 to a generator/motor 30. The generator/motor 30 is designed to operate at the engine speeds of turbine engine 12. The rotation of the second shaft 28 causes the rotor (not shown) within the generator/motor 30 to turn and thereby create an AC electric current. Generator/motor 30 is designed to provide most of the electric current needed to drive a hybrid electric vehicle.

As will be more fully described below, the generator/motor 30 is also operable as a motor so as to receive electric current and rotate a flywheel. The generator/motor 30 is connected to an inverter/power controller 32. Inverter/power controller 32 converts the AC electric current coming from the generator/motor 30 into DC electric current. Many electric vehicles use DC current to operate DC drive motors or as an interim before being reconverted to AC to operate an AC drive motor. Inverter/power controller 32 also limits the amount of current that passes to or from generator/motor 30 to prevent the electric current from exceeding the capacities of the motor/generator 30.

The inverter/power controller 32 provides electric current to electric drive motor/generator 34. The electric drive motor/generator 34 is directly coupled to the vehicle wheels 36 and provides the tractive force necessary to propel the vehicle. The drive motor/generator 34 may be either AC or DC. If drive motor 34 is AC, an additional inverter (not shown) is necessary to receive the DC current from inverter/power controller 32. The electric drive motor 34 is preferably also operable as a generator to provided regenerative breaking for the vehicle. When drive motor/generator 34 is operating as a generator, rotational energy from the vehicle drive wheels 36 causes the drive motor/generator 34 to create an AC current and slow the vehicle. The regenerative electric current passes through the inverter/power controller 32 to the generator/motor 30. The generator/motor 30 is caused to operate as a motor and rotates the second shaft 28. Electric current from drive motor/generator 34 is stored as rotational energy. The inverter/power controller 32 coordinates the operation of the drive motor/generator 34 and the generator/motor 30. The excess rotational energy in the second shaft 28 may be stored within a high-speed flywheel assembly 38.

The flywheel assembly 38 is magnetically coupled to the second shaft 28 by means of a magnetic coupling 42. The flywheel assembly 38 is directly coupled to second shaft 28 by means of a magnetic coupling 42. The magnetic coupling 42 comprises a magnetic spindle 44 that is attached to the second shaft 28. A magnetic rotor 46 is attached to the flywheel 40 and overlies the spindle 44. Commercially available magnetic couplings are capable of transmitting the torque from the second shaft 28 to the flywheel 40. The magnetic coupling 42 provides a direct rotational coupling between the second shaft 28 and the flywheel 40, that is, every revolution in the second shaft 28 causes a revolution in the flywheel 40. The magnetic coupling 42 is used so that a vacuum containment vessel 48 may be placed completely around the flywheel 40. The air within the vessel 48 is evacuated to reduce the air resistance and drag on the flywheel 40. This reduced drag increases the efficiency of the flywheel 40 when compared to flywheels operating in ambient air. Commercially available co-axial couplings are manufactured by Dexter Magnetic Materials Division, Sylvania, Ohio.

Figure 1A:
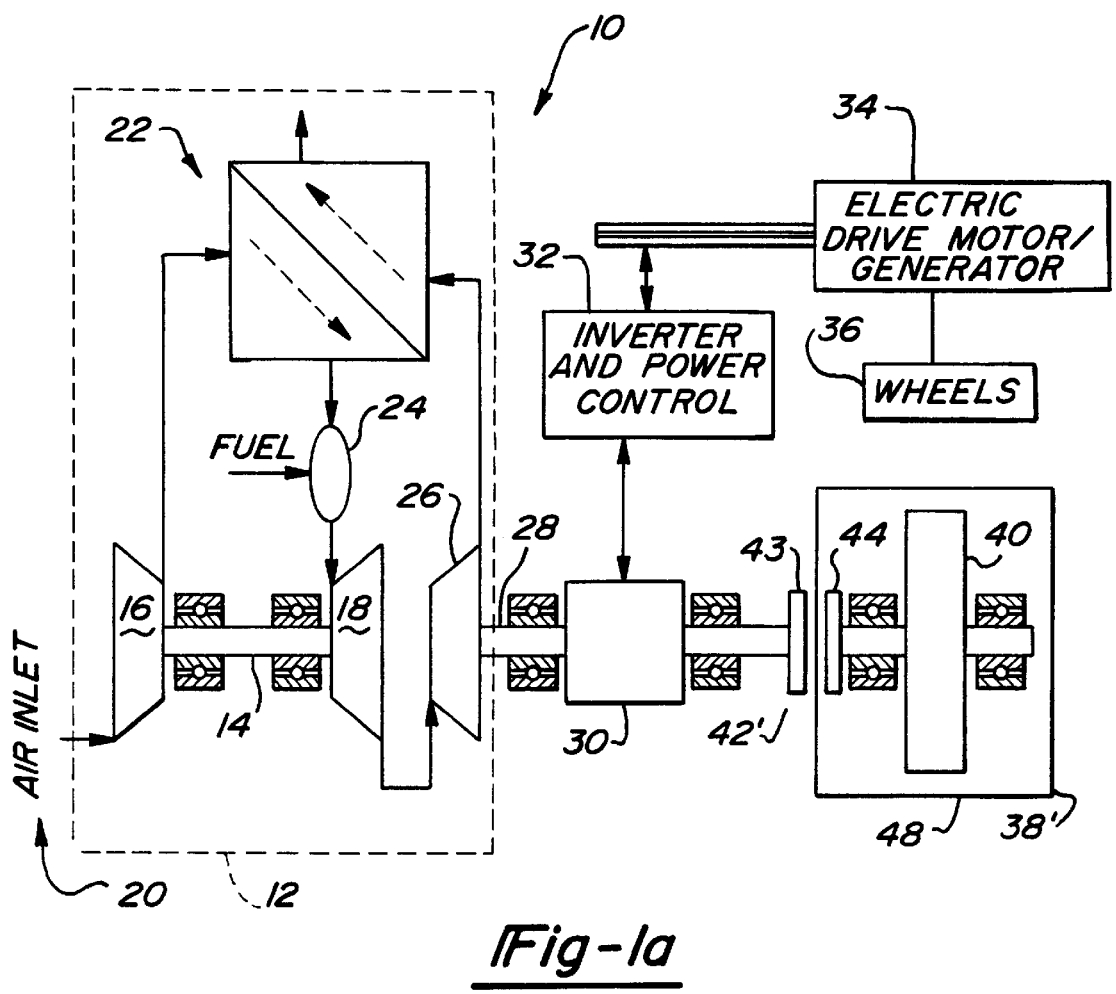
FIG. 1a is a diagrammatic view of an alternative embodiment of the magnetic coupling shown in FIG. 1.

An alternative to the spindle/rotor magnetic coupling 42 illustrated in FIG. 1, is a plate-type magnetic coupling illustrated in FIG. 1a. A plate-type magnetic coupling 42' comprises two opposing plates 43, 45, each having a permanent dipole magnet. Opposite poles of the magnets in plates 43, 45 (not shown) cause plate 43 to magnetically couple to plate 45 and directly rotate flywheel 40. The plate-type magnetic coupling includes a barrier which mounts with a flange (not shown) surrounding a hole in the vacuum housing. Plate-type magnetic couplings are commercially available and exemplary couplings include those manufactured by Dexter Magnetic Materials Division, Sylvania, Ohio.

Plate-type magnetic couplings are less complex and lower in cost in comparison to spindle/rotor-type magnetic couplings. However, plate-type magnetic couplings are attracted to one another. The bearings supporting the second shaft 28 and flywheel 40 must be designed to compensate for this attraction.

The turbine engine 12 is started by a conventional starter (not shown). Because the first shaft 14 rotates independently of the second shaft 28, the engine 12 may be started easily with a relatively small starter. Only the compressor turbine 16 and the gasifier turbine 18 need to rotate to start the engine 12. After the engine 12 is started, exhaust gases from the gasifier turbine 18 are directed to the power turbine 26 and begin to spin up the second shaft 28 to normal operating speeds. The generator/motor 30 is mounted concentricity about the second shaft 28 and rotates with the power turbine 26. The rotating generator/motor 30 creates an AC electric current that is directed to the inverter/power controller 32. The mass of the generator/motor 30 and of flywheel 40 may cause the second shaft 28 to rotate at a slower speed than the first shaft 14 if the size and shape of the gasifier turbine 18 and the power turbine 26 are comparable. This difference in rotating speed is allowed without compromising efficiency because the first and second shafts 14, 28 are uncoupled.

Electric current from generator/motor 30 is provided to inverter/power controller 32 and then to the electric drive motor/generator 34. The drive motor/generator 34 powers wheels 36 and provides motion for the vehicle. When the vehicle undergoes a high load condition such as passing maneuver or climbing a hill, the additional load required by the drive motor/generator 34 draws a higher current from inverter/power controller 32. This increased load causes an increased torque demand on the generator/motor 30. The additional torque needed to overcome the temporary load demanded by drive motor/generator 34 is provided from the rotational energy within flywheel 40. As energy is drawn from flywheel 40 by generator/motor 30, the speed of the second shaft 28 drops. When the temporary high load condition is relieved, the excess power produced by engine 12 is again directed to increasing the speed of the flywheel 40.

When the vehicle is operated in a regenerative braking mode, electric current from the drive motor/generator 34 passes through the inverter/power controller 32 and causes the generator/motor 30 to act as a motor. The generator/motor 30 causes the second shaft 28 and the flywheel 40 to spin faster and stores the excess electric current produced by the regenerative braking condition as rotational kinetic energy within flywheel 40. This excess rotational kinetic energy may be returned to the vehicle in a form of AC electric current through generator/motor 30 operating as a generator.

The vehicle may be operated for short periods of time merely by the rotational kinetic energy stored within flywheel 40. Flywheel 40 rotates second shaft 28 and causes the generator/motor 30 to produce an AC electric current. The power turbine 26 also rotates together with second shaft 28. However, first shaft 14, the gasifier and compressor turbines 18, 16 are not rotated.

Figure 2:
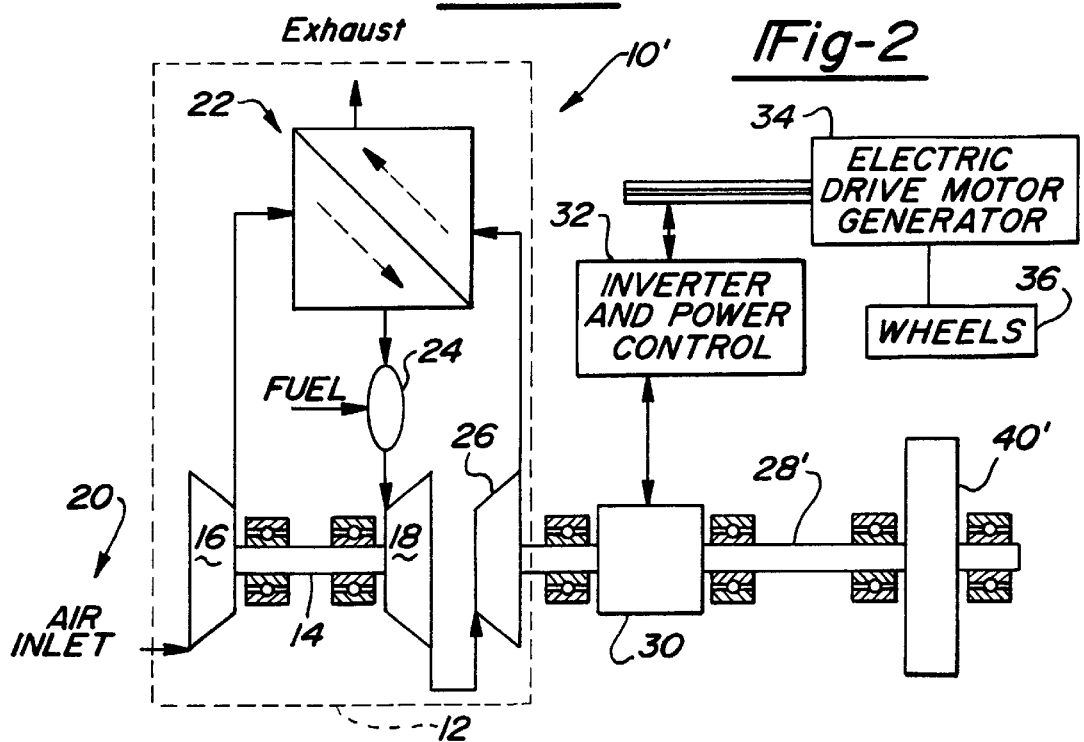
FIG. 2 is yet another alternative embodiment of the present invention without the vacuum containment chamber.

In the alternative embodiment of the present invention illustrated in FIG. 2, the vacuum containment vessel and magnetic coupling are eliminated. Flywheel 40' is directly connected to an extended second shaft 28'. This alternative embodiment is less expensive to produce than the embodiments shown in FIGS. 1 and 1a because the magnetic coupling and vacuum containment vessel are eliminated. This alternative embodiment has lower operating efficiency due to the air drag on flywheel 40'. The drag on flywheel 40' lowers the overall operating efficiency of the vehicle but it also reduces the lost and complexities of the hybrid propulsion system 10'.

Figure 3:
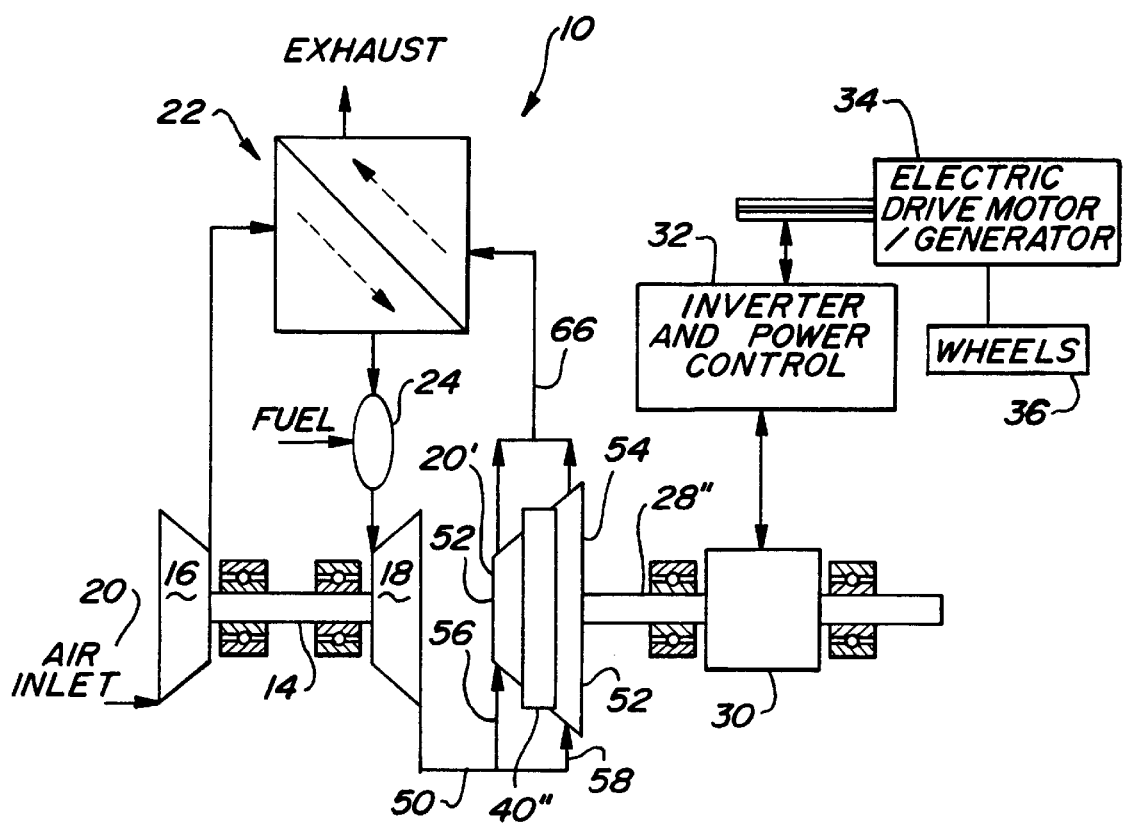
FIG. 3 is still further another alternative embodiment of the present invention combining the flywheel between blades of the power turbine.

FIG. 3 illustrates yet another alternative embodiment of the present invention which eliminates the need for a magnetic coupling and a vacuum chamber yet does not include the air drag normally associated with a free-standing flywheel. While the engine components described in embodiments illustrated in FIGS. 1, 1a and 2 are commercially available, the power turbine/flywheel assembly 20' illustrated in FIG. 3 is unique.

The embodiment illustrated in FIG. 3 combines the flywheel 40" between two halves of the power turbine. Exhaust gases from the gasifier turbine 18 are diverted into two flow paths by a Y-shaped diverter 50. The exhaust gases spin two turbine blades 52. 54. Flywheel 40" is attached between blades 52, 54 to a second shaft 28'. The turbine blades 52, 54 and flywheel 40" spin as a unit. The exhaust gases passing through power turbine 20' combine in a Y-shaped diverter 66 to form one combined flow path that leads into the heat exchanger 22.

Figure 4:
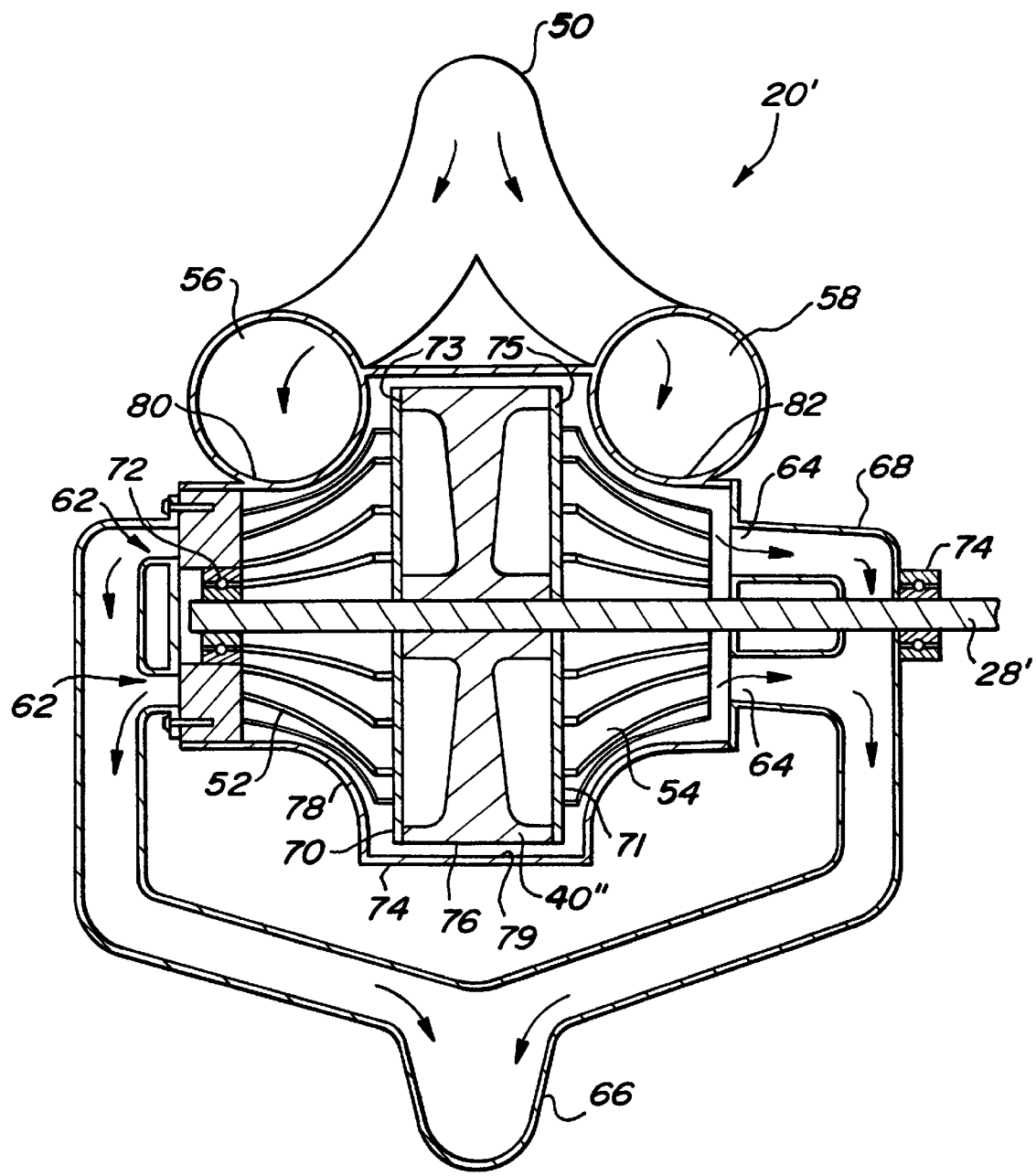
FIG. 4 is a cross-sectional view of the power turbine/flywheel illustrated in FIG. 3.

Illustrated in FIG. 4 is a cross-sectional view of the power turbine/flywheel assembly 20'. Exhaust gases entering through the diverter 50 are directed into flow paths 56, 58. The flow paths 56, 58 receive an approximately equal amount of exhaust gas from the diverter 50. Gases from flow path 56 enter turbine blade 52 radially at the largest diameter of the turbine blade 52. The entering exhaust gases are at a high pressure and temperature. The exhaust gases expand in turbine blade 52 and exit axially through a flow path outlet 62. The gases exiting the power turbine/flywheel assembly 20' are reduced in pressure and temperature. The expanding exhaust gases from flow path 56 rapidly rotate the turbine blade 52. Exhaust gases passing through flow path 58 rotate the turbine blade 54 and axially exit power turbine/flywheel assembly 20' through a flow path outlet 64. The expanded exhaust gases from the outlets 62, 64 are combined in diverter 66 into one flow path. Exhaust gases passing through outlets 62, 64 are combined in diverter 66 and are directed to heat exchanger 22 (not shown in this view). The outlet 64 allows the second shaft 28' to pass through a manifold 68.

Positioned between turbine blades 52, 54 is the flywheel 40". The turbine blades 52,54 and flywheel 40" are all directly attached to the second shaft 28' and rotate as a unit. End plates 70, 71 serve to support turbine blades 52, 54 and close the ends of the turbine volutes to the flow of exhaust gases. End plates 70, 71 secure turbine blades 52, 54 to the axial surfaces 73, 75 of flywheel 40" as shown. Bearings 72, 74 serve to support the second shaft 28'.

The aerodynamic drag experienced by the flywheel 40" is believed to be less than that experienced the flywheel 40' as shown in FIG. 2. The flywheel-to-air contact occurs along a radial surface 76. The axial surfaces 73, 75 of the flywheel 40" are covered by the plates 70, 71 and are free of aerodynamic drag. The turbine blades 52, 54 and the flywheel 40" are contained in a housing 78. Housing 78 has an interior radial portion 79 that closely conforms to the flywheel radial surface 76. The space between radial surface 76 and the interior portion 79 is relatively small in the order of 1 centimeter or less and is chosen to minimize aerodynamic losses. Housing 78 includes apertures 80, 82 that receive exhaust gases from flow paths 56, 58. Exhaust gases entering apertures 80, 82 flow over the radial surface 76. The radial surface 76 may optionally include ribs or dimples (not shown) or another surface texture to minimize the aerodynamic drag between the exhaust gas and the radial surface 76. The amount of air drag is believed to be minimal because the exhaust gas and the radial surface 76 are both moving in the same direction and at approximately the same speed. While the embodiment illustrated in FIGS. 3 and 4 may not be as efficient as a flywheel totally enclosed in a vacuum chamber, this embodiment reduces the cost and complexity of the overall system by eliminating the need for the vacuum enclosure and magnetic coupling.

While the invention has been illustrated by its preferred embodiments, other embodiments of the present invention are also possible and are intended to be covered within the spirit and scope of the attached claims.

What is claimed:

1. A hybrid electric propulsion system for a vehicle comprising:

an electric drive motor;

a generator supplying electric current to said motor;

a flywheel;

a vacuum containment vessel enclosing said flywheel; and a dual shaft turbine engine, said engine having a compressor and a gasifier coupled to a first shaft and a power turbine, said flywheel and said generator coupled to a second shaft, said first and second shafts being uncoupled and exhaust gases from said gasifier cause said power turbine to rotate, whereby said rotating power turbine turns said generator and flywheel.

2. The hybrid electric propulsion system of claim 1, wherein said flywheel is coupled to said second shaft by a magnetic coupling.

3. The hybrid electric propulsion system of claim 2, wherein said power turbine and said generator rotate concentrically about said second shaft.

4. The hybrid electric propulsion system of claim 3, wherein said second shaft has first and second ends, said power turbine is attached to said first end and a magnetic coupling spindle is attached to said second end; and wherein said flywheel is attached to and concentrically rotates about a magnetic coupling rotor, said spindle magnetically driving said rotor and turning said flywheel.

5. The hybrid electric propulsion system of claim 4, wherein said generator is attached to said second shaft between said power turbine and said magnetic coupling.

6. A hybrid electric propulsion system for a vehicle comprising:

an electric drive motor/generator attached to vehicle drive wheels;

a generator/motor supplying and receiving electric current to and from said motor/generator;

a flywheel;

a vacuum containment vessel enclosing said flywheel; and a dual shaft turbine engine, said engine having a compressor and a gasifier coupled to a first shaft and a power turbine, said flywheel and said generator/motor coupled to a second shaft, said first and second shafts being uncoupled and exhaust gases from said gasifier turning said power turbine, said turning power turbine turns said generator/motor and said flywheel and causes said generator to generate electric current and operate said motor/generator to rotate said drive wheels, and said drive wheels cause said motor/generator to generate electric current under regenerative braking and operate said generator/motor to rotate said flywheel.

7. The hybrid electric propulsion system of claim 6, wherein said flywheel is coupled to said second shaft by a magnetic coupling.

8. The hybrid electric propulsion system of claim 7, wherein said power turbine and said generator rotate concentricity about said second shaft.

9. The hybrid electric propulsion system of claim 8, wherein said second shaft has first and second ends, said power turbine is attached to said first end and a magnetic coupling spindle is attached to said second end; and wherein said flywheel is attached to and concentricity rotates about a magnetic coupling rotor, said spindle magnetically drives said rotor and turns said flywheel.

10. The hybrid electric propulsion system of claim 9, wherein said generator is attached to said second shaft between said power turbine and said magnetic coupling.

11. A hybrid electric propulsion system for a vehicle comprising:

an electric drive motor/generator attached to vehicle drive wheels;

a generator/motor supplying and receiving electric current to and from said motor/generator;

a dual shaft turbine engine, said engine having a compressor and a gasifier coupled to a first shaft, and a power turbine and a generator coupled to a second shaft, said first and second shafts are uncoupled from each other;

a magnetic coupling couples said second shaft to a flywheel, wherein said second shaft, power turbine, generator and flywheel all rotate as a unit, exhaust gases from said gasifier turn said power turbine and cause said generator to generate electric current and operate said motor/generator to rotate said drive wheels, and said drive wheels cause said motor/generator to generate electric current under regenerative braking and operate said generator/motor to rotate said flywheel; and a vacuum enclosure surrounding said flywheel.

12. The hybrid electric propulsion system of claim 11, wherein said second shaft has first and second ends, said power turbine is attached to said first end and a magnetic coupling spindle is attached to said second end; and wherein said flywheel is attached to and concentricity rotates about a magnetic coupling rotor, said spindle magnetically driving said rotor and turning said flywheel.

\* \* \* \* \*

UNITED STATES PATENT AND TRADEMARK OFFICE
CERTIFICATE OF CORRECTION

PATENT NO. : 5,826,673
DATED : October 27, 1998
INVENTOR(S) : Bates, Stephan, Belaire It is certified that error appears in the above-identified patent and that said Letters Patent is hereby corrected as shown below:

Column 1, after the title insert the following :

This invention was made with Government support under NREL Subcontract No. ZCB-4-13032-02 Prime Contract No. DE-AC36-83CH10093 awarded by the Department of Energy. The Government has certain rights in this invention.

Signed and Sealed this

Fourth Day of May, 1999

Q. TODD DICKINSON

*Attest:*

*Attesting Officer*

Acting Commissioner of Patents and Trademarks